Feb. 3, 1942.  A. F. GREINER  2,271,974

POWER TRANSMITTING MECHANISM

Filed Jan. 8, 1940

INVENTOR.
ANTON F. GREINER
BY
ATTORNEYS

ACHINE ELEMENTS, SHAFTING
FLEXIBLE SHAFT COUPLINGS.

Patented Feb. 3, 1942

2,271,974

UNITED STATES PATENT OFFICE 2,271,974

POWER TRANSMITTING MECHANISM

Anton F. Greiner, Detroit, Mich.

Application January 8, 1940, Serial No. 313,007

5 Claims. (Cl. 64—18)

This invention relates generally to power transmitting mechanisms and refers more particularly to mechanisms of this type embodying torque transmitting universal joints.

It is one of the principal objects of this invention to simplify, render more efficient and reduce the cost of manufacture of power transmitting mechanisms equipped with universal joints of the torque transmitting type. According to this invention, the cost of manufacture is appreciably reduced by providing a torque transmitting universal joint having provision for operatively connecting the driving and driven members of the mechanism without the necessity of employing the usual complicated forked shaft end which required costly forging and machining operations.

Another advantageous feature of this invention resides in the provision of a torque transmitting universal joint characterized in the relatively wide angle of deflection permitted between the driving and driven members without jeopardizing the effectiveness of the joint in transmitting torque from the driving member to the driven member.

A further feature of this invention which contributes materially to the smooth, relatively vibrationless operation of the driving mechanism consists in supporting the end of the drive shaft adjacent the universal joint in two bearings spaced axially of the shaft in close proximity to each other and to the universal joint. As a result, the stability of the driving mechanism is appreciably increased and the drive shaft is relieved of vibrations caused by the force reactions developed in the universal joint.

A still further object of this invention resides in the provision of driving mechanism of the type set forth wherein the universal joint is provided with a housing having a hub splined on the end of the drive shaft and supported in a bearing surrounding the hub. In motor vehicle installations, the drive shaft may be the main shaft of a variable speed transmission having an antifriction bearing for the shaft supported in the rear wall of the transmission case and having provision for securing the hub bearing aforesaid to the rear wall of the transmission case. Due to the relatively large inertia of the transmission case and due to the fact that both bearings are secured to the housing, it follows that excessive vibration is prevented.

The foregoing, as well as other objects of this invention, will be made more apparent as this description proceeds, especially when considered in connection with the accompanying drawing, wherein—

Figure 1:
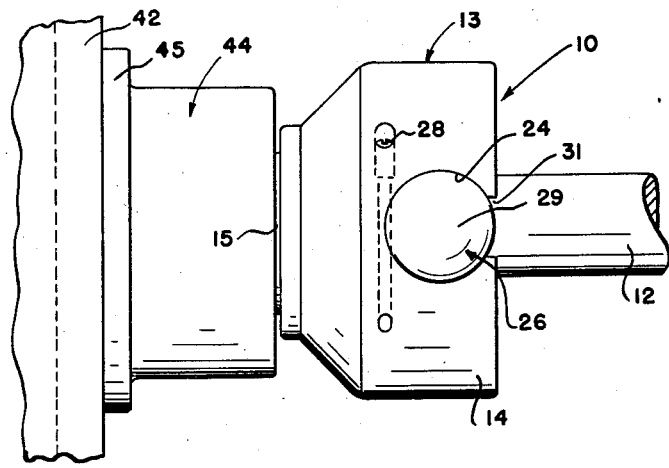
Figure 1 is a fragmentary side elevational view, partly in section, of power transmitting mechanism embodying the present invention.
Figure 2:
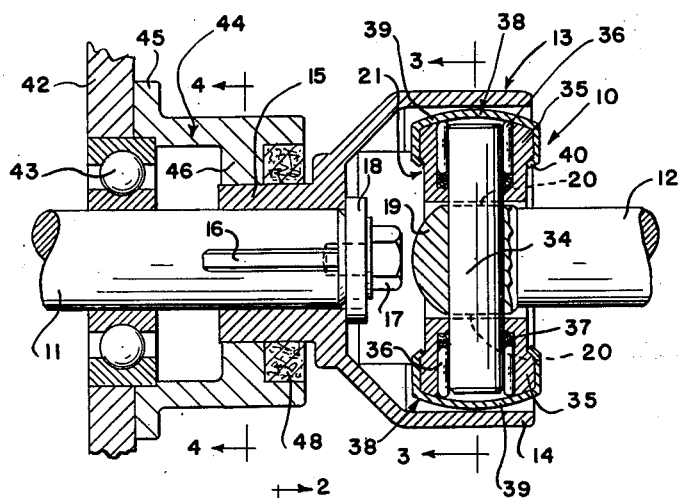
Figure 2 is a longitudinal sectional view taken substantially on the plane indicated by the line 2—2 of Figure 3.
Figures 3, 4:
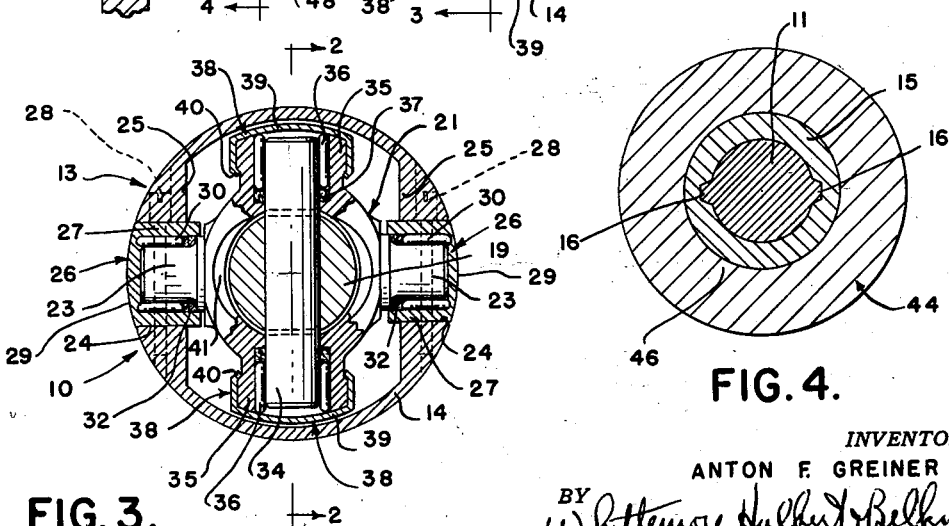
Figure 3 is a cross sectional view taken substantially on the plane indicated by the line 3—3 of Figure 2.
Figure 4 is a cross sectional view taken on the line 4—4 of Figure 2.

The power transmitting mechanism forming the subject matter of this invention embodies a torque transmitting universal joint 10 for operatively connecting a drive shaft 11 to a driven shaft 12. Upon reference to Figure 2, it will be noted that the universal joint 10 comprises a housing 13 having an enlarged cylindrical portion 14 for receiving the forward end of the driven shaft 12 and having a reduced hub portion 15 slidably receiving the rear end portion of the drive shaft 11. The hub 15 is shown in Figure 4 as keyed to the rear end of the drive shaft 11 for rotation therewith as a unit by means of suitable keys 16 and is held in place on the drive shaft by means of a locking screw 17 accessible through the rear end of the universal joint housing 13. It will be observed from Figure 2 that the locking screw 17 is threaded into the rear end of the drive shaft 11 and serves to clamp an enlargement in the form of a washer 18 against the rear end of the shaft. The diameter of the washer 18 exceeds the internal diameter of the hub portion 15 and abuts the rear end of the hub portion in a manner such that the housing 13 is prevented from slipping off the rear end of the shaft 11.

The forward end of the driven shaft 12 is fashioned with a spherical enlargement 19 having diametrically opposed flattened portions 20 and extending into a yoke 21 which, in turn, is positioned within the cylindrical enlargement 14 of the universal joint housing 13. Upon reference to Figure 3, it will be noted that the yoke is provided with journals 23 extending radially outwardly from diametrically opposite sides thereof and having a common axis intersecting the axis of the driven shaft 12. The journals 23 respectively project into openings 24 extending through suitable bosses 25 formed integral with the cylindrical flange 14 of the universal joint housing at diametrically opposite sides of the flange. Each opening 24 is closed by a suitable cup-shaped bearing cap 26 having an annular body 27 sleeved into the opening 24 and secured in place by means of a locking screw 28. The outer surface 29 of the base portions of the caps are concentric with the axis of the universal joint housing 13 and form, in effect, a continuation of the cylindrical outer surface of the annular portion 14 on this housing.

The internal diameter of each of the bearing caps 26 is greater than the external diameter of the journals 23 by an amount sufficient to permit needle bearing rollers 30 to be inserted between the journals 23 and the inner surfaces of the flanges 27 on the bearing caps 26. As a result, an antifriction torque transmitting connection is provided between the universal joint housing 13 and the yoke 21.

Attention is called to the fact at this time that the rear edge of the cylindrical portion 14 on the universal joint housing 13 is slotted, as at 31, adjacent each opening 24. The width of the slots 31 is slightly greater than the journals 23 so as to permit the journals to be extended through the slots into the openings and thereby facilitate assembly of the yoke in the housing 13. The needle bearing rollers 30 together with bearing body 27 are then inserted around the journals 23 and the bearing caps 26 are secured in place. It is to be noted, however, that before the needle bearing rollers 30 are assembled on the journals 23, a suitable lubricant sealing ring 32 is sleeved over each journal 23 and the parts are lubricated during assembly so as to insure satisfactory operation over a long period of use.

The ball end of the driven shaft 12 is formed with a transverse opening therethrough at the flattened portions 20 and a pin 34 is pressed into the opening. The length of the pin is greater than the diameter of the ball end 19 of the shaft, but is less than the internal diameter of the cylindrical portion 14 on the universal joint housing 13 and the axis of the pin intersects the axis of the shaft and extends perpendicular to both the latter axis and the axis of the journals 23. The radially outer ends of the pins project into nipples 35 formed on the yoke 21 between the journals 23. The internal diameter of the nipples exceeds the external diameter of the pin by an amount sufficient to provide for inserting needle bearing rollers 36 between the radially outer ends of the pin and the adjacent side walls of the nipples. Prior to assembling the needle bearing pins into the nipples, suitable lubricant sealing rings 37 are sleeved on the pins into engagement with the radially inner walls of the nipples and the needle bearings are lubricated during assembly so as to insure efficient operation. The radially outer end of the nipples are formed with spherically shaped surfaces having a common center of curvature coincident with the point of intersection of the axis of said pin 34 and the axis of the driven shaft 12. The outer end of each nipple is closed by a cup-shaped cap 38 having a base 39 conforming in shape to the radially outer surfaces of the nipples and engaging the latter surfaces. The cylindrical flanges of the caps are sleeved over the nipples and are secured in place by crimping the free edges thereof over suitable shoulders 40 formed on the nipples. As shown in Figure 3, the relative dimensions of the ports are such that the base portions 39 of the caps are spaced radially inwardly from the adjacent inner surfaces of the annular portion 14 on the joint housing 13 to provide the required clearance.

With the driving mechanism thus far described, it will be noted that torque is transmitted from the drive shaft 11 to the universal joint housing 13 through the keys 16 and from the housing 13 to the yoke 21 through the boss portions 25 on the housing and journals 23 on the yoke 21. The driving force thus applied to the yoke 21 is transmitted from the latter to the transverse pin 34 and from the pin 34 to the driven shaft 12.

It will also be observed from the foregoing description that the yoke 21, together with the driven shaft 12, may swing relative to the drive shaft 11 in a vertical plane about the common axis of the trunnions 23 without interfering with the transmission of torque from the drive shaft to the driven shaft. In addition, it will be seen that the driven shaft may be swung in a horizontal plane relative to the yoke 21 about the axis of the transverse pin 34. The opening 41 through the yoke 21 is enlarged in the manner shown in Figure 3 to provide the desired clearance for swinging movement of the shaft 12 about the pin 34.

It also follows from the above that by reason of the unique yoke construction and arrangement of the pin 34, the desired results are obtained without resorting to costly forged end shafts which require considerable machining. Accordingly, the construction of the joint is simplified considerably and the cost of manufacture is substantially reduced.

The operation of the universal joint is rendered smooth and substantially vibrationless by increasing the stability of the drive shaft support. In detail, it will be noted from Figure 2 that the drive shaft 11 represents the main shaft of a variable speed transmission having a housing provided with a rear wall 42 apertured to permit the rear end of the shaft 11 to extend therethrough. A ball bearing 43 is positioned in the aperture for supporting the shaft 11 and is secured in place by means of a housing 44 surrounding the hub 15 of the universal joint housing 13. The housing 44 is provided with a radially outwardly extending flange 45 at the forward end bolted to the rear wall 43 of the transmission housing and having a radially inwardly extending annular flange 46 intermediate the ends forming a bearing for the hub 15. A suitable lubricant sealing ring 48 is mounted in the housing 44 at the rear side of the bearing flange 46 and prevents the escape of lubricant out of the housing 44.

The two bearings 43 and 46 are arranged in close proximity to each other and form a highly effective support for the drive shaft and universal joint housing capable of withstanding excessive bending stresses without deflecting the shaft or producing excessive vibrations.

What I claim as my invention is:

1. In driving mechanism, a shaft, a bearing for the shaft secured in a structural element, a universal joint having a housing provided with a hub splined on the shaft adjacent the bearing, and a housing encircling the hub having a flange rigidly secured to the structural element and having a radially inwardly extending portion forming a bearing for the hub of said joint.

2. In driving mechanism, a shaft, a bearing for the shaft secured in a structural element, a universal joint having a housing provided with a hub splined on the shaft adjacent the bearing, a housing surrounding the hub having a portion rigidly secured to the structural element and having another portion abutting the bearing to retain the latter in place, a flange portion extending radially inwardly from the housing intermediate the ends and forming a bearing for the hub of said joint, and a lubricant sealing ring surrounding the hub beyond said flange portion and secured in place by said housing.

3. In a universal joint, a housing, a revoluble member having one end extending into the housing, a yoke located in the housing and having an enlarged opening therethrough for receiving said end of the revoluble member, journals projecting radially outwardly from opposite sides of the yoke in diametrically opposed relation, nipples projecting radially outwardly from opposite sides of the yoke in diametrically opposed relation and located between the journals within the housing, said nipples having the outer ends open and having annular shoulders spaced radially inwardly from said ends, means on the housing rotatably receiving the journals in torque transmitting relation thereto, torque transmitting elements extending transversely of the revoluble member from diametrically opposite sides of the latter and having a common axis perpendicular to the angle of the journals, said torque transmitting elements having cylindrical portions projecting into the nipples, bearings inserted into the nipples through the open ends thereof in engagement with the cylindrical portions of the torque transmitting elements, and cup-shaped retainers having annular flanges respectively sleeved over the nipples and having the inner ends bent laterally over the shoulders on the nipples to secure the retainers in place, the base portions of the retainers extending over the open ends of the nipples to close the latter ends and also engageable with the bearings to prevent outward displacement of said bearings.

4. In a universal joint, a member having an opening therein and having an outwardly projecting portion provided with a bore open at the outer end, an annular shoulder surrounding the outwardly projecting portion and spaced radially inwardly from the outer end of said portion, a second member extending into the opening in the first member and having a transversely projecting torque transmitting element extending into said bore, a bearing inserted into the bore through the open end of the latter and engageable with the torque transmitting element, and a cup-shaped retainer having an annular flange sleeved over the outwardly projecting portion on the first member and having the free end bent laterally inwardly beneath said shoulder to secure the retainer in place, said retainer having the base portion thereof extending over the open end of the bore to close the latter and to provide a stop for preventing displacement of the bearing in an outward direction.

5. In a universal joint, a housing having a continuous annular flange provided with diametrically opposed openings through opposite side walls thereof and having slots extending from said openings to the free edge of the annular flange, a yoke located within the confines of the annular flange, journals extending radially outwardly from opposite sides of the yoke in diametrically opposed relation and insertable into the openings through said slots, cup-shaped retainers having annular side walls respectively extending into the openings in said annular flange in concentric relation to the journals and having a greater internal diameter than said journals, roller bearing elements supported in the annular space around the journals within the cup-shaped retainers and having a bearing engagement with both the inner surfaces of the side walls of the retainers and the external surfaces of the journals, the base portions of the retainers forming an abutment for the radially outer ends of the bearing elements to prevent outward displacement of the latter elements, and means housed by the cup-shaped retainers and engageable with the radially inner ends of the bearing elements to prevent movement of the latter in an inward direction relative to the cup-shaped retainers.

ANTON F. GREINER.